United States Patent [19]

König et al.

[11] Patent Number: 5,389,585
[45] Date of Patent: Feb. 14, 1995

[54] FINE NON-OXIDE CERAMIC POWDERS

[75] Inventors: Theo König, Laufenburg-Rotzel; Dietmar Fister, Murg-Niederhof, both of Germany

[73] Assignee: H.C. Starck GmbH and Co., Goslar, Germany

[21] Appl. No.: 51,519

[22] Filed: Apr. 26, 1993

[30] Foreign Application Priority Data

May 4, 1992 [DE] Germany .............................. 4214725

[51] Int. Cl.[6] .............................................. C04B 35/52
[52] U.S. Cl. ........................................ 501/87; 501/88; 501/92; 501/152
[58] Field of Search ...................... 501/87–92, 501/100, 102, 127, 152, 153, 154, 12

[56] References Cited

U.S. PATENT DOCUMENTS

| | | | |
|---|---|---|---|
| 4,642,207 | 2/1987 | Uda et al. | 264/10 |
| 4,689,075 | 8/1987 | Uda et al. | 75/0.5 B |
| 4,769,064 | 9/1988 | Buss et al. | 75/0.5 B |
| 4,889,665 | 12/1989 | Uda et al. | 264/10 |
| 4,923,691 | 5/1990 | Peters et al. | 423/412 |
| 4,948,762 | 8/1990 | Krumbe et al. | 501/92 |
| 4,994,107 | 2/1991 | Flagan et al. | 75/367 |

FOREIGN PATENT DOCUMENTS

| | | |
|---|---|---|
| 0151490 | 8/1985 | European Pat. Off. . |
| 0152957 | 8/1985 | European Pat. Off. . |
| 0251322 | 1/1988 | European Pat. Off. . |
| 0347566 | 12/1989 | European Pat. Off. . |
| 0379910 | 8/1990 | European Pat. Off. . |
| 3536933 | 4/1987 | Germany . |

OTHER PUBLICATIONS

G. W. Elger, D. E. Traut, G. J. Slavens, and S. J. Gerdemann: "Preparation of Submicron Titanium Nitride Powder by Vapor-Phase Reactions", *Metallurgical Transactions B*, Aug. 1989, vol. 20B, pp. 493–497.
Orbit abstract of EP 0379 910 Jan. 1990.
Orbit abstract of DE 35 36 933 Oct. 1985.

*Primary Examiner*—Karl Group
*Assistant Examiner*—Chris Gallo
*Attorney, Agent, or Firm*—Connolly & Hutz

[57] ABSTRACT

The invention relates to fine non-oxide ceramic powders MeX, wherein
Me = B, Al, Si, Ti, Zr, Hf, V, Y, Ta, Nb, Mo, W, La, Fe, Co, Ni and/or Cr and
X = C, N, B and Si or combinations thereof, with the exception of $Si_3N_4$ greater than 100 nm and AlN greater than 200 nm.

15 Claims, 1 Drawing Sheet

FINE NON-OXIDE CERAMIC POWDERS

The present invention relates to fine non-oxide ceramic powders MeX, wherein

Me=B, Al, Si, Ti, Zr, Hf, V, Y, Ta, Nb, Mo, W, La, Fe, Co, Ni and/or Cr and

X=C, N, B and Si or combinations thereof, with the exception of $Si_3N_4$ greater than 100 nm and AlN greater than 200 nm.

With regard to the mechanical characteristics of components manufactured by powder-metallurgic or powder-ceramic methods, the characteristics of the initial powders are of crucial importance. In particular, a narrow particle-size distribution, a high degree of powder purity and an absence of coarse-grained portions or agglomerates have a favourable effect on the characteristics of corresponding components.

Numerous processes have become well-known for the industrial manufacture of fine metallic and ceramic powders.

Besides the purely mechanical comminution and grading processes, which have the disadvantage that powders can only be manufactured up to a certain fineness and with relatively broad particle-size distribution, a great number of processes for precipitation from the vapour phase have also been proposed.

Sometimes, as a result partly of very small energy sources, such as thermal plasmas or laser beams, or in processes involving turbulent flames, or in case of a chlorine-hydrogen burner, the particle-size distribution and particle size of the manufactured powders cannot be precisely controlled, and the reaction conditions usually lead to a broad particle-size distribution as well as the appearance of individual particles having diameters that are multiples of the average particle size.

With the currently familiar large-scale process for manufacturing powders it is scarcely possible, or only possible with considerable difficulty, to manufacture powders having average particle sizes of less than 0.5 $\mu$m, determined in accordance with FSSS (and not the individual particle size). With these fine powders manufactured by conventional methods the practical possibility cannot be excluded that a certain percentage of coarse grain is contained in the material, having a harmful effect on the mechanical characteristics of components manufactured therefrom. Conventional grinding processes also result in a very broad particle-size distribution, which with these powders can also not be reduced substantially by sifting.

Processes known hitherto for manufacturing ultrafine powders via the vapour phase are in part two-stage processes, wherein the second stage serves to convert the more or less amorphous intermediate product into crystalline form and to separate off unwanted by-products arising from the reaction.

Other vapour-phase processes do not operate with a hot-wall reactor which has been optimised with regard to flow characteristics, but for the purpose of reaction make use of a plasma flame or other energy carriers such as laser beams. Disadvantages of these processes are essentially the reaction conditions which in practice cannot be controlled in various sectors of the reaction zone having very large temperature gradients and/or turbulent flows. As a result, powders are obtained having broad particle-size distribution.

Numerous processes have been proposed for manufacturing ultrafine powders of hard material, all of which, however, have disadvantages. For instance, the process disclosed in U.S. Pat. No. 4,994,107, in which a tubular reactor for manufacturing uniform, non-agglomerated powders is described, also has considerable practical disadvantages. On account of the mixing of all reaction partners upstream of the hot zone there is no definite starting-point for the nucleation reaction. Wall reactions can also not be prevented. This increases the danger of large particles getting into the otherwise fine powder, from which they can no longer be removed. EP-A 0 379 910 describes a two-stage process for manufacturing $Si_3N_4$ from the vapour phase, in which the initial halide in the liquid state is blown into the reactor space via a two-fluid nozzle. Also with this process it is not possible to prepare an acceptable powder.

Other proposals for manufacturing very fine uniform powders include reaction below atmospheric pressure and also various sol-gel processes. These proposals also have disadvantages, such as multi-stage processing, poor controllability of particle size, particle-size distribution and batch operation.

The proposed plasma, laser or explosion processes (EP-A 0 152 957, EP-A 0 151 490) also have the stated disadvantages.

The manufacture of fine powders by specially conducted magnesiothermic reaction of the corresponding metal chlorides for producing, e.g., TiN or TiC also does not achieve the fineness and uniformity of the powders manufactured according to the proposed process (G. W. Elger, Met. Transactions 20 B, 8, 1989, pp 493–497).

Similarly, the processes disclosed in U.S. Pat. Nos. 4,642,207, 4,689,075, EP-A 152 957 and EP-A 151 490, which relate to the vaporising of metal by arc or electron beams as well as reaction of gaseous reaction partners in a glow discharge, do not meet the demands imposed by economic considerations on the operation of a process for manufacturing very uniform and very fine powders.

Amorphous $Si_3N_4$ powders with a particle size of 0.1 to 1 $\mu$m and crystalline $Si_3N_4$ powders with particle sizes from 0.15 to 1.0 $\mu$m are known from DE-A 3 536 933. AlN powders having smallest particle sizes of about 0.3 $\mu$m are described in DE-A 3 833 382.

In the search for non-oxide ceramics with improved mechanical, electrical and magnetic characteristics there is a demand for ever finer non-oxide ceramic powders.

With the noble-gas condensation process it is first and foremost possible to produce ultrafine non-oxide ceramic powders in the nanometer range. In this connection it is admittedly only possible to produce quantities in milligrams. And they are not obtained with a narrow particle-size distribution.

The purpose of this invention is consequently the provision of powders that do not exhibit the disadvantages described for powders manufactured in accordance with the state of the art.

Powders have now been discovered which meet these requirements. These powders are the object of this invention.

It is consequently an object of this invention to produce fine non-oxide ceramic powders MeX, wherein Me=B, Al, Si, Ti, Zr, Hf, V, Y, Ta, Nb, Mo, W, La, Fe, Co, Ni and/or Cr and X=C, N, B and Si or combinations thereof, with the exception of $Si_3N_4$ greater than 100 nm and AlN greater than 200 nm, wherein they have a particle size between 1.0 nm and 500 nm and fewer than 1% of the individual particles exhibit a deviation of more than 40% and no individual particles exhibit a deviation of more than 60% from the average particle size.

Preferably fewer than 1% of the individual particles exhibit a deviation of more than 20% and no individual particles exhibit a deviation of more than 50% from the average particle size; most preferably, fewer than 1% of the individual particles exhibit a deviation of more than 10% and no individual particles exhibit a deviation of more than 40% from the average particle size.

The powders according to the invention preferably have particle sizes from 1 to less than 100 nm, most preferably from 1 to less than 50 nm.

Preferred non-oxide ceramic powders are WC, SiC, $B_4C$, ZrC, VC, HfC, $Mo_2C$, $Cr_3C_2$ or nitrides of the elements B, Al, Si, Ti, Zr, Hf, V, Nb, Ta, Mo and W. $MoSi_2$ and $TiB_2$ are also preferred. The powders according to the invention exhibit a high degree of purity. For instance, the oxygen content is preferably less than 5000 ppm, most preferably less than 1000 ppm. Particularly pure powders according to the invention are characterised in that they have an oxygen content of less than 100 ppm, preferably less than 50 ppm.

The proportion of non-oxidic contaminants is also very small. For example, the sum total of the contaminants, disregarding the oxidic contaminants, preferably amounts to less than 5000 ppm, most preferably less than 1000 ppm.

In an especially preferred embodiment, the sum total of the contaminants, disregarding oxidic contaminants, is less than 200 ppm.

The powders according to the invention can be obtained on a industrial scale and hence are available i.e., are produced preferably in quantities exceeding 1 kg.

The powders according to the invention can be obtained in a process for manufacturing fine ceramic powders by reaction of suitable metallic compounds and suitable reaction partners in the vapour phase —CVR—, wherein the metallic compound(s) and the other reaction partners are caused to react in a reactor in the gaseous state, are condensed out directly from the vapour phase homogeneously subject to the exclusion of any wall reaction, and are then separated off from the reaction medium, this being characterised in that the metallic compounds and the reaction partners are introduced into the reactor separately from one another at not less than reaction temperature. In case several metallic compounds and/or reaction partners are to be introduced, the respective gas mixtures should be chosen in such a way that no reaction takes place during heating which leads to the formation of solid reaction products. This process can be carried out with particular advantage in a tubular reactor. It is particularly advantageous if the metallic compounds, the reaction partners and the product particles pass through the reactor in a laminar flow.

By the separate preheating of the process gases to at least reaction temperature the site of nucleation can be restricted. The laminar flow in the reactor ensures a narrow distribution of residence time of the nuclei or the particles. In this way a very narrow particle-size distribution can be obtained.

Consequently, the metallic compounds and the reaction partners should preferably be introduced into the reactor as coaxial laminar partial flows.

In order however to ensure the thorough mixing of the two coaxial partial flows, a Kármán vortex path of defined intensity and flare is produced by incorporating an interfering body in the otherwise strictly laminar flow.

A preferred embodiment of this process therefore consists in that the coaxial, laminar partial flows of the metallic compound(s) and the reaction partners are mixed in defined manner by means of a Kármán vortex path.

In order to prevent the strongly favoured precipitation of the reaction participants on the reactor wall, the reaction medium is preferably screened off from the reaction wall by a layer of inert gas. This can be brought about by introducing through specially shaped annular gaps in the reactor wall a flow of inert gas which due to the Coanda effect hugs the reactor wall. The ceramic powder particles arising in the reactor as a result of homogeneous precipitation from the vapour phase with typical residence times between 10 and 300 msec leave the reactor together with the gaseous reaction products (e.g., HCl), the unconverted reactants and the inert gases, which are blown in to serve as carrier gas, flushing gas and for the purpose of reducing HCl adsorption. With the process according to the invention, yields can be achieved of up to 100%, in relation to the metallic component.

Separation of the metallic or ceramic powders is then preferably effected at temperatures above the boiling- or sublimating-temperatures of the metallic compounds and reaction partners employed and/or of the by-products which are bound to accrue during the reaction. Separation can be effected advantageously in a blow-back filter. When this is operated at high temperatures of, e.g., 600° C., the adsorption of the gases, in particular of the non-inert gases such as HCl, $NH_3$, $TiCl_4$ etc. on the very large surface of the ceramic or metallic powders can be kept to a low level. In particular, the formation of $NH_4Cl$ during production of nitrides is prevented (greater than 350° C.).

The remaining interfering substances adsorbed on the powder surfaces can be further removed in a vacuum container situated downstream, again preferably at temperatures of about 600° C. The finished powders should then be discharged from the plant subject to the exclusion of air.

Preferred metallic compounds in the sense of this invention are one or several from the group $BCl_3$, boric acid esters, boranes, $SiCl_4$, other chlorosilanes, silanes, metal halides, partially hydrated metal halides, metal hydrides, metal alcoholates, metal alkyls, metal amides, metal azides, metal borohydrides and metal carbonyls.

Preferred reaction partners are one or several from the group $H_2$, $NH_3$, hydrazine, amines, $CH_4$, other alkanes, alkenes, alkynes, aryls, $O_2$, air, $BCl_3$, boric acid esters, boranes, $SiCl_4$, other chlorosilanes and silanes.

The powders according to the invention can be nano- or microdisperse (crystalline or amorphous) ceramic powders, wherein preferred ceramic powders are carbides, nitrides, borides, silicides, phosphites, sulphides, oxides and/or combinations thereof of the elements B, Al, Si, Ti, Zr, Hf, Y, V, Nb, Ta, Cr, Mo, W, La, Y, Fe, Co, Ni, or these elements on their own or combined with one another.

With this process it is possible to manufacture ceramic powders having an adjustable particle-size between 1 and 3000 nm (3 μm) and an extremely narrow particle-size distribution. The particles according to the invention are characterised by the total absence of particles which are substantially larger than the average particle size.

Other characteristics of the powders are their high degree of purity, high degree of surface purity and good reproducibility.

Depending on particle size and material, the powders according to the invention can be very sensitive to air or even pyrophoric. In order to eliminate this characteristic, these powders can be surface-modified in defined manner by subjecting them to gas/steam mixtures.

Figure 1:
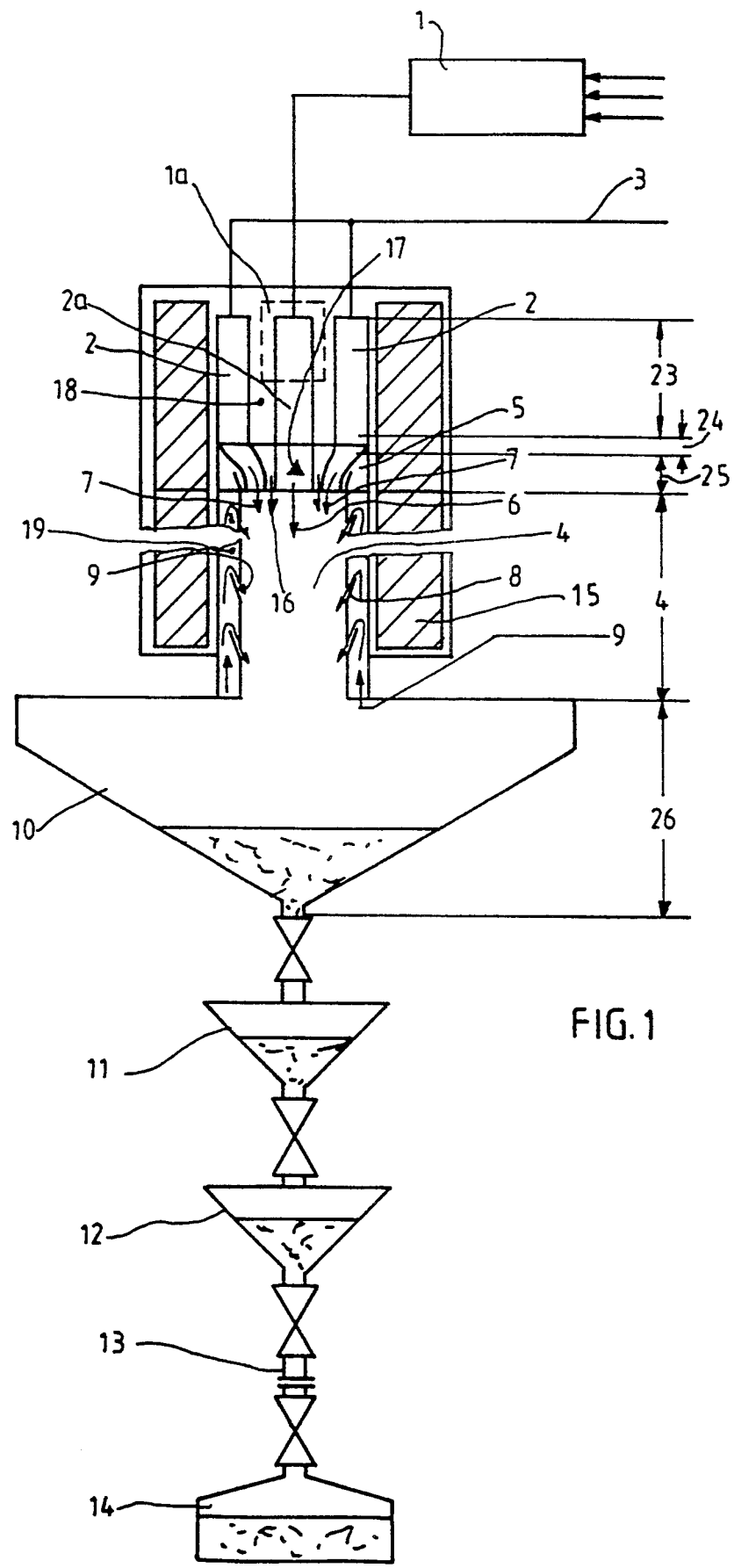
FIG. 1 is the schematic representation of a device with which this process can be carried out. The implementation of this process is explained below with reference to FIG. 1. In this connection, the process, material and/or device parameters stated explicitly merely represent possibilities chosen from many and consequently do not limit the invention.

The solid, liquid or gaseous metallic compounds are charged in measured doses into a vaporiser (1) situated outside or a vaporiser (1a) situated inside the high-temperature furnace, are vaporised there at temperatures from 200° C. to 2000° C. and transported by an inert carrier gas ($N_2$, Ar or He) into the gas preheater (2a). The other reaction partners (3), such as $H_2$, $NH_3$ and $CH_4$, are likewise heated in a gas preheater (2). Prior to entering the tubular reactor (4) the turbulent individual stream filaments emerging from the gas preheaters (2) are formed in a nozzle (5) into two coaxial, laminar and rotationally symmetrical stream filaments. In the tubular reactor (4) the middle stream filament (6), which contains the metallic component, and the covering stream filament (7), which contains the remaining reaction partners, mix together thoroughly under defined conditions. Reaction sets in at temperatures between 500° C. and 2000° C., e.g. in accordance with the following examples:

| | | | | | | | | |
|---|---|---|---|---|---|---|---|---|
| $TiCl_4$ | + | $NH_3$ | + | $\frac{1}{2} H_2$ | → | TiN | + | 4 HCl or |
| $TiCl_4$ | + | $CH_4$ | | | → | TiC | + | 4 HCl or |
| $AlCl_3$ | + | $NH_3$ | | | → | AlN | + | 3 HCl or |
| $TiCl_4$ | + | $2BCl_3$ | + | $5 H_2$ | → | $TiB_2$ | + | 10 HCl or |
| $TaCl_5$ | + | $CH_4$ | + | $\frac{1}{2} H_2$ | → | TaC | + | 5 HCl or |
| $4 BCl_3$ | + | $CH_4$ | + | $4 H_2$ | → | $B_4C$ | + | 12 HCl or |
| $MoCl_5$ | + | $2SiCl_4$ | + | $6\frac{1}{2} H_2$ | → | $MoSi_2$ | + | 13 HCl or |
| $3 SiH_4$ | + | $4NH_3$ | | | → | $Si_3N_4$ | + | $12 H_2$ |

In order to ensure the thorough mixing of the two coaxial stream filaments, a Kármán vortex path can be produced by incorporating an interfering body (17) in the otherwise strictly laminar flow. In a preferred embodiment of the present invention, the obstacle (17) is disposed in the flow-shaping part (25), preferably along the longitudinal axis of the central coaxial nozzle (i.e., the nozzle which produces the middle stream (6)). The two coaxial stream filaments are separated at the nozzle outlet by a weak flow of inert gas (16) in order to prevent accretions on the nozzle (5).

It is particularly preferred to incorporate the evaporator within the high temperature furnace, for example, within the gas preheater (2a). This avoids the need for feed pipes outside the reactor, thus, avoiding corrosion and the resulting impurities. By locating the evaporator within the preheater it is also possible to use non-metal materials for the construction of the evaporator, so that evaporation temperatures can be employed which are higher than the temperatures for which metal materials are designed.

In order to prevent the strongly favoured heterogeneous precipitation of these substances on the hot reactor wall, the latter is flushed, through annular gaps (8), with a flow of inert gas (9) ($N_2$, Ar or He) which due to the Coanda effect hugs the reactor wall. The ceramic powder particles arising in the reactor by homogeneous precipitation from the vapour phase leave the reactor together with the gaseous reaction products (e.g., HCl), the inert gases and the unconverted reactants and directly enter a blow-back filter (10) in which they are deposited. The blow-back filter (10) is operated at temperatures between 300° C. and 1000° C., as a result of which the adsorption of the gases, particularly the non-inert gases such as HCl, $NH_3$ and $TiCl_4$, on the very large surface of these powders is kept to a low level. In addition, the formation of $NH_4Cl$ from excess $NH_3$ (in the production of metal nitrides) and HCl is prevented. In a following container (11) the residues of the gases adsorbed on the powders are further reduced preferably by alternate application of vacuum and flooding with various gases at 300° C. to 1000° C. Good effects are achieved if gases such as $N_2$, Ar or Kr are used. $SF_6$ is particularly preferred.

This process also enables the production of metastable material systems and particles with core/mantle structures. In this connection metastable material systems are obtained by establishing very high cooling rates in the lower part of the reactor.

The particles with core/mantle structure are obtained by introducing additional reaction gases in the lower part of the reactor.

The powders emerge from the evacuation container (11) into the cooling container (12) before they reach, via the sluice (13), the collection and despatch container (14). In the cooling container (12) the particle surfaces can be surface-modified in defined manner by blowing in various gas/steam mixtures.

By way of material for components which are exposed to temperatures of up to 2000° C. and more, such as heat exchangers (2) and (2a), nozzle (5), reactor (4) and reactor casing tube (15), use can preferably be made of coated graphite, in particular of fine-grain graphite. Coating may, e.g., be required if the necessary chemical resistance of the graphite to the gases employed, such as metal chlorides, HCl, $H_2$, $NH_3$ and $N_2$, is not sufficient at the given temperatures, or if erosion at higher flow speeds (0.5–50 m/sec) is quite considerable, or if the gas imperviousness of the graphite can thereby be increased, or if the surface roughness of the reactor components can thereby be reduced.

Suitable for use as coatings are, e.g., SiC, $B_4C$, TiN, TiC and Ni (only up to 1200° C.). Combinations of various coatings, e.g. with a "type-specific" surface coating, are also possible. These coatings can be applied advantageously by means of CVD, plasma spraying and electrolysis (Ni).

If only low temperatures are necessary, the use of metallic substances is also possible.

In order to adjust the particle sizes of the ceramic powders three ways of proceeding may be adopted simultaneously:

The setting of a definite ratio of the reaction gases and inert gases.

The setting of a definite pressure.

The setting of a definite temperature/residence-time profile along the reactor axis.

The temperature/residence-time profile is adjusted as follows:

By two or several heating zones from the start of the gas preheater (2) to the end of the tubular reactor (4).

By varying the reactor cross-section along its longitudinal axis.

By Varying the gas throughputs and, thereby, with given reactor cross-section, the flow speeds.

A significant advantage of the variability of the temperature/residence-time profile is the possibility of decoupling the nucleation zone from the nucleus-growth zone. For the production of "coarser" powders (e.g., in the range about 0.1 μm to about 3 μm for TiN) at very low temperature and with short residence time (i.e. small reactor cross-section for a definite length), this enables the formation of just a few nuclei to be permitted, which then at high temperature and with long residence time (large reactor cross-section) can grow into "coarse" particles. It is also possible to produce "fine" powders (e.g., for TiN in the range about 3 nm to about 100 nm): in an area of high temperature and relatively long residence time the formation of very many nuclei is achieved, which in the remainder of the reactor grow only a little at low temperatures and with short residence time (small reactor cross-section). It is possible to set all interim states between the borderline cases that have been described here qualitatively.

In the cooling container (12) it is possible to bring about passivation of the powders, which are in part very sensitive to air or even pyrophoric, by blowing in a suitable gas/steam mixture. The particle surfaces of these ceramic powders can be covered with both an oxide layer of defined thickness and suitable organic compounds such as higher alcohols, amines or, immediately, sintering agents such as paraffins in an inert flow of carrier gas. Coating can also be effected with regard to the processing options for the powders.

The oxide layers can, e.g., be applied with a flow of inert gas and air of defined moisture and also with a flow of inert gas and $CO_2$ (suitable, preferably, for carbides).

On the basis of their mechanical, electrical and magnetic characteristics, the powders according to the invention having particles in the nanometer range are suitable for manufacturing new types of sensors, actors, cutting ceramics, structural ceramics and cermets.

The invention is elucidated further below on the basis of examples which should not be taken to constitute any limitation.

EXAMPLE 1

TiN was produced according to the reaction equation

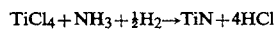

$TiCl_4 + NH_3 + \frac{1}{2}H_2 \rightarrow TiN + 4HCl$ in an apparatus according to FIG. 1, wherein an excess of $NH_3$ and $H_2$ was maintained.

To this end, 100 g/min $TiCl_4$ (liquid, boiling-point 136° C.) were charged in doses into the vaporiser (1), vaporised and heated to 800° C. together with 50 Nl/min $N_2$. This gas mixture was conveyed to the gas preheater (2a). The reaction partners $H_2$ (200 Nl/min) and $NH_3$ (95 Nl/min) were introduced into the gas preheater (2). The reaction partners were preheated separately from one another to a temperature of about 1000° C. The temperature was measured with a W5Re–W26Re thermocouple (18) at the place shown in FIG. 1 (1175° C.). Before entering the reaction tube (4), the turbulent individual stream filaments emerging from the gas preheaters (2) were formed in the outer part of the nozzle (5) into a homogeneous, rotationally symmetrical and laminar annular flow. The gas flow emerging from the gas preheater (2a) was likewise laminarised in the nozzle (5) and introduced into the annular flow. With this arrangement the nozzle (5) consisted of three partial nozzles arranged coaxially to one another. From the middle partial nozzle there emerged a flow of inert gas (16) which displaced the site of the start of the reaction, i.e. the meeting of the two partial flows (6) and (7), away from the nozzle into the reaction tube. In the inner stream filament a Kármán vortex path was produced by the interfering body (17) with a characteristic dimension of 3.0 mm (arranged along the longitudinal axis of the nozzle). The reaction tube with an overall length of 1100 mm had an interior diameter at the nozzle outlet of 40 mm; 200 mm below the nozzle the interior diameter was 30 mm; and at the exit it was 50 mm. In this regard the interior cross-section was steadily changed in accordance with the principles of flow. The reaction tube (4) was composed of 18 segments, wherein the segments were each connected by a distancing and centering ring. In each of these places there was an annular gap (8). The temperature of the reaction tube (4) was adjusted to 1080° C., measured with the W5Re–W26Re thermocouple (19) on the exterior wall of the reactor 400 mm below the nozzle. The pressure in the reaction tube (4) was practically identical with the pressure in the blow-back filter (10). This amounted to 250 mbar of excess pressure. The reactor wall was flushed with 200 Nl/min $N_2$ through 18 annular gaps (8). If the reactor wall is not flushed with an inert gas, accretions can arise which can in part lead very quickly to closure of the reactor and thereby to the termination of the process; in any case, however, on account of the changing reactor geometry a likewise changing product is produced. In order to reduce the HCl partial pressure, 200 Nl/min $N_2$ were blown into the reaction tube (4) through the sixth annular gap from below with an additional gas-introduction device. The product (TiN with a uniform particle size of about 10 nm) was separated from the gases ($H_2$, $NH_3$, HCl, $N_2$) in the blow-back filter (10) at a temperature of 600° C.

This temperature was chosen on the one hand in order to prevent the formation of $NH_4Cl$ (>350° C.), and on the other hand in order to keep the primary coating of the very large particle surfaces (115 $m^2/g$) with HCl to a low level (about 1.5% Cl).

The TiN produced in this way was collected for 40 min (i.e. 1300 g) in the blow-back filter, in order then to be transferred to the evacuation container (11). In this container eight pump-flood cycles with terminal vacua of 0.1 mbar abs. were run through within a period of 35 min. The container was in each case flooded with Ar up to a pressure of 1100 mbar abs. After 35 min the TiN powder treated in this way was transferred to the cooling container (12). In this container it is also possible to effect targeted surface tailoring by blowing in various gas/steam mixtures. After the powder had been cooled to less than 50° C. it was transferred, without contact with the external air, through the sluice (13) to the collecting and despatch container.

The pyrophoric TiN powder with a specific surface of 115 m²/g according to BET, determined by the N₂-1-point method (DIN 66 131), equivalent to 10 nm, exhibited an extremely narrow particle-size distribution.

A REM photograph of this TiN powder with a specific surface of 115 m²/g showed the very narrow distribution of the particle dimensions and the absence of excessively large particles. Fewer than 1% of the individual particles then exhibit a deviation of more than 10% and no individual particles exhibit a deviation of more than 40% from the average particle size. Given the current state of measuring technology, reliable indications of particle-size distribution of such extremely fine powders can only be obtained by imaging methods (e.g., REM, TEM).

Analysis of this TiN powder revealed an oxygen content of 95 ppm and the sum total of non-oxidic contaminants amounted to 800 ppm.

EXAMPLE 2

TiN was produced according to the reaction equation

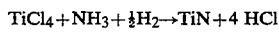

in an apparatus according to FIG. 1, wherein an excess of NH₂ and H₂ was maintained.

To this end, 100 g/min TiCl₄ (liquid, boiling-point 136° C.) were charged in doses into the vaporiser (1), vaporised and heated to 950° C. together with 50 Nl/min N₂. This gas mixture was conveyed to the gas preheater (2a). The reaction partners H₂ (200 Nl/min) and NH₃ (95 Nl/min) were introduced into the gas preheater (2). The reaction partners were preheated separately from one another to a temperature of about 700° C. The temperature was measured with a W5Re–W26Re thermocouple (18) at the place shown in FIG. 1 (850° C.). Before entering the reaction tube (4), the turbulent individual stream filaments emerging from the gas preheaters (2) were formed in the outer part of the nozzle (5) into a homogeneous, rotationally symmetrical and laminar annular flow. The gas flow emerging from the gas preheater (2a) was likewise laminarised in the nozzle (5) and introduced into the annular flow. With this arrangement the nozzle (5) consisted of three partial nozzles arranged coaxially to one another. From the middle partial nozzle there emerged a flow of inert gas (16) which displaced the site of the start of the reaction, i.e. the meeting of the two partial flows (6) and (7), away from the nozzle into the reaction tube. In the inner stream filament a Kármán vortex path was produced by the interfering body (17) with a characteristic dimension of 4.0 mm (arranged along the longitudinal axis of the nozzle). The reaction tube with an overall length of 1320 mm had an interior diameter at the nozzle outlet of 25 mm; from 120 mm to 180 mm below the nozzle the interior diameter widened to 48 mm; at the exit it amounted to 65 mm. In this regard the interior cross-section was steadily changed in accordance with the principles of flow. The reaction tube (4) was composed of 22 segments, wherein the segments were each connected by a distancing and centering ring. In each of these places there was an annular gap (8). The temperature of the reaction tube (4) was adjusted to 1570° C., measured with the W5Re–W26Re thermocouple (19) on the exterior wall of the reactor 400 mm below the nozzle. The pressure in the reaction tube (4) was practically identical with the pressure in the blow-back filter (10). This amounted to 250 mbar of excess pressure. The reactor wall was flushed with 200 Nl/min N₂ through 22 annular gaps (8). If the reactor wall is not flushed with an inert gas, accretions can arise which can in part lead very quickly to closure of the reactor and thereby to the termination of the process; in any case, however, on account of the changing reactor geometry a likewise changing product is produced. In order to reduce the HCl partial pressure, 200 Nl/min Ar were blown into the reaction tube (4) through an additional annular gap in the sixth segment from below with an additional gas-introduction device. The product (TiN with a uniform particle size of about 50 nm) was separated from the gases (H₂, NH₃, HCl, N₂) in the blow-back filter (10) at a temperature of 600° C.

This temperature was chosen on the one hand in order to prevent the formation of NH₄Cl (>350° C.), and on the other hand in order to keep the primary coating of the very large particle surfaces (41.5 m²/g) with HCl to a low level (about 1% Cl).

The TiN produced in this way was collected for 40 min (i.e. 1300 g) in the blow-back filter, in order then to be transferred to the evacuation container (11). In this container eight pump-flood cycles with terminal vacua of 0.1 mbar abs. were run through within a period of 35 min. The container was in each case flooded with Ar up to a pressure of 1100 mbar abs. After 35 min the TiN powder treated in this way was transferred to the cooling container (12). In this container it is also possible to effect targeted surface tailoring by blowing in various gas/steam mixtures. After the powder had been cooled to less than 50° C. it was transferred, without contact with the external air, through the sluice (13) to the collecting and despatch container.

The pyrophoric TiN powder with a specific surface of 41.5 m²/g according to BET, determined by the N₂-1-point method (DIN 66 131), equivalent to 50 nm, exhibited an extremely narrow particle-size distribution.

A REM photograph of this TiN powder with a specific surface of 41.5 m²/g showed the very narrow distribution of the particle dimensions and the absence of excessively large particles. Fewer than 1% of the individual particles then exhibit a deviation of more than 10% and no individual particles exhibit a deviation of more than 40% from the average particle size. Given the current state of measuring technology, reliable indications of particle-size distribution of such extremely fine powders can only be obtained by imaging methods (e.g., REM, TEM).

Analysis of this TiN powder revealed an oxygen content of 70 ppm and a sum total of non-oxidic contaminants of 820 ppm.

EXAMPLE 3

TiN was produced according to the reaction equation

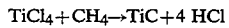

in an apparatus according to FIG. 1, wherein an excess of CH₄ was maintained and H₂ was additionally added.

To this end, 90 g/min TiCl₄ (liquid, boiling-point 136° C.) were charged in doses into the vaporiser (1a), vaporised and heated to 1200° C. in the gas preheater (2a) together with 50 Nl/min Ar. The reaction partners H₂ (170 Nl/min) and CH₄ (25 Nl/min) were introduced into the gas preheater (2). The reaction partners were preheated separately from one another to a temperature of about 1050° C. The temperature was measured with a W5Re–W26Re thermocouple (18) at the place shown in FIG. 1 (1200° C.). Before entering the reaction tube (4), the turbulent individual stream filaments emerging from the gas preheaters (2) were formed in the outer part of the nozzle (5) into a homogeneous, rotationally symmetrical and laminar annular flow. The gas flow emerging from the gas preheater (2a) was likewise laminarised in the nozzle (5) and introduced into the annular flow. In this middle stream filament a Kármán vortex path was produced by the interfering body (17) with a characteristic dimension of 4.0 mm (arranged along the longitudinal axis of the nozzle). The reaction tube with an overall length of 1320 mm had a diameter at the nozzle outlet of 25 mm; from 120 to 180 mm below the nozzle the interior diameter widened to 48 mm; at the exit it amounted to 65 mm. In this regard the interior cross-section was steadily changed in accordance with the principles of flow. The reaction tube (4) was composed of 22 segments, wherein the segments were each connected by a distancing and centering ring. In each of these places there was an annular gap (8).

The temperature of the reaction tube (4) was adjusted to 1700° C., measured with the W5Re–W26Re thermocouple (19) on the exterior wall of the reactor 400 mm below the nozzle. The pressure in the reaction tube (4) was practically identical with the pressure in the blow-back filter (10). This amounted to 250 mbar of excess pressure. The reactor wall was flushed with 200 Nl/min Ar through 22 annular gaps (8). If the reactor wall is not flushed with an inert gas, accretions can arise which can in part lead very quickly to closure of the reactor and thereby to the termination of the process; in any case, however, on account of the changing reactor geometry a likewise changing product is produced. In order to reduce the HCl partial pressure, 200 Nl/min Ar were blown into the reaction tube (4) through an additional annular gap in the sixth segment from below with an additional gas-introduction device. The product (TiC with a uniform particle size of about 50 nm) was separated from the gases ($H_2$, $CH_4$, HCl, Ar) in the blow-back filter (10) at a temperature of 600° C.

This temperature was chosen in order to keep the primary coating of the very large particle surfaces (45.6 $m^2/g$) with HCl to a low level (about 1% Cl).

The TiC produced in this way was collected for 40 min (i.e. 1300 g) in the blow-back filter, in order then to be transferred to the evacuation container (11). In this container eight pump-flood cycles with terminal vacua of 0.1 mbar abs. were run through within a period of 35 min. The container was in each case flooded with Ar up to a pressure of 1100 mbar abs. After 35 min the TiC powder treated in this way was transferred to the cooling container (12). In this container it is also possible to effect targeted surface tailoring by blowing in various gas/steam mixtures. After the powder had been cooled to less than 50° C. it was transferred, without contact with the external air, through the sluice (13) to the collecting and despatch container.

The pyrophoric TiC powder with a specific surface of 45.6 $m^2/g$ according to BET, determined by the $N_2$-1-point method (DIN 66 131), equivalent to 10 nm, exhibited an extremely narrow particle-size distribution.

A REM photograph of this TiC powder with a specific surface of 45.6 $m^2/g$ showed the very narrow distribution of the particle dimensions and the absence of excessively large particles. Fewer than 1% of the individual particles then exhibit a deviation of more than 10% and no individual particles exhibit a deviation of more than 40% from the average particle size. Given the current state of measuring technology, reliable indications of particle-size distribution of such extremely fine powders can only be obtained by imaging methods (e.g., REM, TEM). Analysis of this TiC powder revealed an oxygen content of 80 ppm and a sum total of non-oxidic contaminants of 890 ppm.

What is claimed is:

1. Fine non-oxide ceramic powders MeX, wherein
Me = at least one of B, Al, Si, Ti, Zr, Hf, V, Y, Ta, Nb, Mo, W, La, Fe, Co, Ni and Cr and
X = at least one of C, N, B and Si
wherein the powders exhibit a particle size between 1.0 nm and 500 nm, with the proviso that when MeX is $Si_3N_4$ the particle size is between 1.0 nm and 100 nm and when MeX is AlN the particle size is between 1.0 nm and 200 nm, and further wherein fewer than 1% of the individual particles exhibit a deviation of more than 40% and no individual particles exhibit a deviation of more than 60% from the average particle size of the powders.

2. Powders according to claim 1, wherein fewer than 1% of the individual particles exhibit a deviation of more than 20% and no individual particles exhibit a deviation of more than 50% from the average particle size.

3. Powders according to claim 1, wherein fewer than 1% of the individual particles exhibit a deviation of more than 10% and no individual particles exhibit a deviation of more than 40% from the average particle size.

4. Powders according to claim 1, wherein the particle size ranges from 1 nm to less than 100 nm.

5. Powders according to claim 1, wherein the particle size ranges from 1 nm to less than 50 nm.

6. Powders according to claim 1, wherein the non-oxide ceramic powders are WC, SiC, $B_4C$, ZrC, VC, HfC, $Mo_2C$, $Cr_3C_2$.

7. Powders according to claim 1, wherein the non-oxide ceramic powders comprise a nitride of at least one element selected from the group consisting of B, Al, Si, Ti, Zr, Hf, V, Nb, Ta, Mo and W.

8. Powders according to claim 1, wherein the powders have an oxygen content of less than 5000 ppm.

9. Powders according to claim 1, wherein the powders have an oxygen content of less than 1000 ppm.

10. Powders according to claim 1, wherein the powders have an oxygen content of less than 100 ppm.

11. Powders according to claim 1, wherein the sum total of contaminants in the powders, with the exception of oxidic contaminants, amounts to less than 5000 ppm.

12. Powders according to claim 1, wherein the sum total of contaminants in the powders, with the exception of oxidic contaminants, amounts to less than 1000 ppm.

13. Powders according to claim 1, wherein the sum total of contaminants in the powders, with the exception of oxidic contaminants, amounts to less than 200 ppm.

14. Powders according to claim 1, wherein the powders are produced in quantities in excess of 1 kg.

15. Powders according to claim 1, wherein the powders have an oxygen content of less than 50 ppm.

* * * * *